United States Patent [19]

Goumas et al.

[11] Patent Number: 4,660,274
[45] Date of Patent: Apr. 28, 1987

[54] ROBOT TOOL CHANGING APPARATUS

[76] Inventors: Peter G. Goumas, 108 Carmichael Ct., Cary, N.C. 27511; Quentin J. Hendricks, 214 Lynnwood Dr., Knightdale, N.C. 27545; Michael W. Trull, 102 Dundalk Way, Cary, N.C. 27511

[21] Appl. No.: 802,893

[22] Filed: Nov. 29, 1985

[51] Int. Cl.$^4$ .................. B23Q 3/155; B25J 15/04
[52] U.S. Cl. .................................. 29/568; 901/30; 901/31
[58] Field of Search ............... 403/327, 328, 321, 324; 901/30, 31, 40; 279/76, 79, 1 TS; 29/568

[56] References Cited

U.S. PATENT DOCUMENTS

| | | | |
|---|---|---|---|
| 4,141,133 | 2/1979 | Grinage | 29/568 |
| 4,281,447 | 8/1981 | Miller et al. | 29/568 |
| 4,486,928 | 12/1984 | Tucker et al. | 29/26 |
| 4,510,684 | 4/1985 | Hutchins et al. | 29/703 |
| 4,512,709 | 4/1985 | Hennekes et al. | 414/729 |
| 4,520,550 | 6/1985 | Dunn et al. | 29/568 |
| 4,543,032 | 9/1985 | Leverett et al. | 414/730 |

OTHER PUBLICATIONS

Monforte, Mathew L., "Tool-Changing Robot Hands" in *Robotics Age*, May, 1985, pp. 27–31.
IBM Technical Disclosure Bulletin, vol. 24, No. 7A (Dec. 1981), A. W. Cummins et al., Entitled Removable Robotic Devices.

*Primary Examiner*—Gil Weidenfeld
*Assistant Examiner*—Steven C. Bishop

[57] ABSTRACT

The apparatus effects transfer and connection of tools between a tool holder and at least one bracket of a robot hand. A pin upon the tool holder and a pin upon the bracket are received during tool transfer within a bore extending through the tool shank, one of the pins entering the bore from one end thereof and the other pin entering from the other end of the bore. The free ends of the pins abut during transfer of the tool between the tool holder and the bracket. Two tools may be simultaneously transferred in the preferred embodiment of the apparatus. The connection between the bracket and the tool permits limited movement of the former relative to the latter, and a sensor may be provided to detect such movement.

10 Claims, 7 Drawing Figures

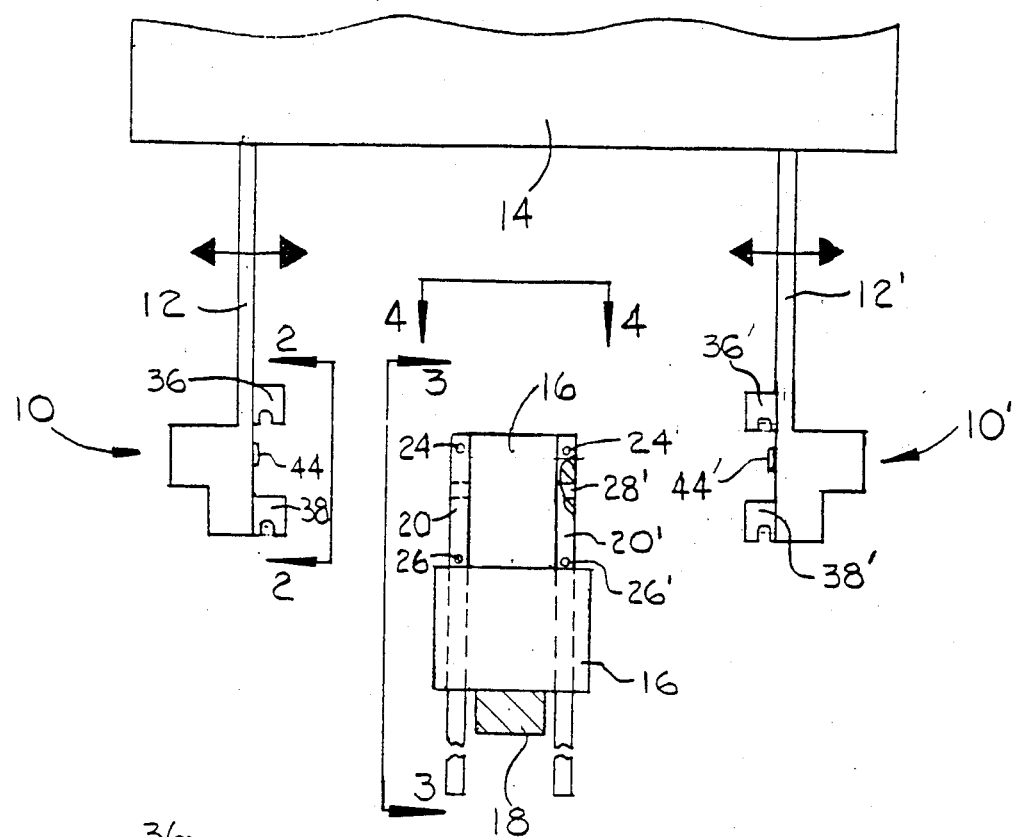
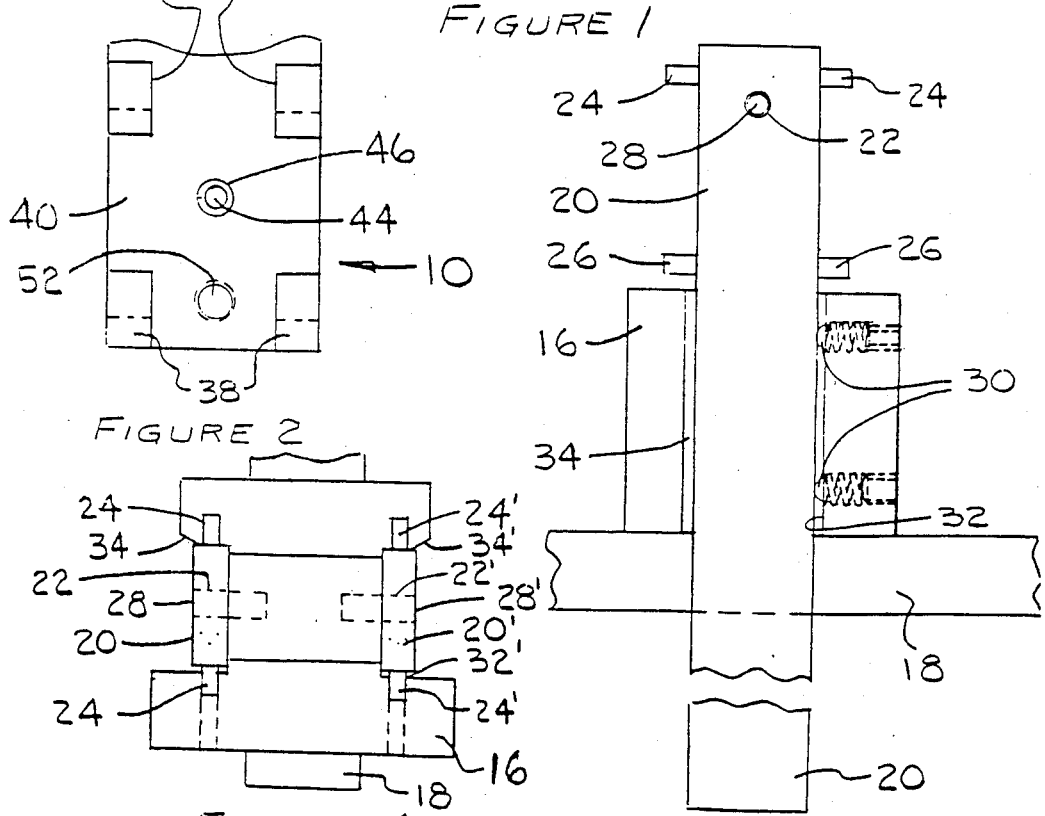
FIGURE 1
FIGURE 2
FIGURE 3
FIGURE 4

ROBOT TOOL CHANGING APPARATUS

FIELD OF THE INVENTION

This invention relates to robotic devices, and more specifically relates to a tool changing apparatus that permits rapid interchange of tools between tool holders and tool supporting hands or similar components of a robot.

BACKGROUND OF THE INVENTION

The performance of certain tasks by an industrial robot may require the robot's sequential use of a plurality of tools of differing types. For efficient utilization of the robot, the tool changing operations should be performable rapidly and automatically, without manual intervention. In many utilizations it is also highly desirable for the tool changing apparatus to be of a purely "passive" type that is free from relatively expensive and maintenance-requiring switches, motors and similar "active" components. In some utilizations it is also highly desirable for the robot to be able to simultaneously interchange a plurality of tools during each tool changing operation.

Tool changing systems for robots or the like are disclosed in U.S. Pat. Nos. 4,486,928, 4,520,550, 4,512,709, 4,510,684 and 4,543,032; and in IBM Technical Disclosure Bulletin Vol. 24, No. 7A, December 1981, pgs. 3273–3275.

SUMMARY OF THE INVENTION

The present invention provides an apparatus permitting rapid automated change of tools by a robot. The apparatus is of a purely "passive" type, and ma.y if desired be employed to effect simultaneous interchange of a plurality of tools during each tool-changing operation. In a specific preferred embodiment thereof, the tool changing apparatus of the invention includes a tool holder, at least one bracket means upon the "hand" or similar component of a robot, at least one tool adapted to be transferred between and selectively connected to the tool holder and the bracket means, first engageable and disengageable connecting means upon the bracket means and upon the tool for connecting the tool at desired times to the bracket, and second engageable and disengageable connecting means upon the tool holder and the tool for at other desired times connecting the tool to the holder. The aforesaid two connecting means include pin elements upon the bracket means and upon the tool holder, which pin elements are respectively receivable during tool interchange within opposite end portions of an opening extending through the shank portion of the tool.

DESCRIPTION OF THE DRAWINGS

Other aspects of the invention will be apparent from the following description of an illustrative embodiment thereof, which should be read in conjunction with the accompanying drawings, in which:

FIG. 1 is an elevational view of apparatus in accordance with the invention;

FIG. 2 is an enlarged side elevational view, taken in the direction of the arrows 2—2 of FIG. 1, of a bracket of the apparatus;

FIG. 3 is an enlarged side elevational view, taken in the direction of the arrows 3—3 of FIG. 1, of the tool holder of the apparatus, of one of the tools supported by the holder, and of the support underlying the tool holder, some of the compnents being only fragmentarily shown;

FIG. 4 is an enlarged top plan view, taken in the direction of the arrows 4—4 of FIG. 1, of the tool holder and tools shown in FIG. 1.

DESCRIPTION OF THE PREFERRED EMBODIMENT

Figure 5:
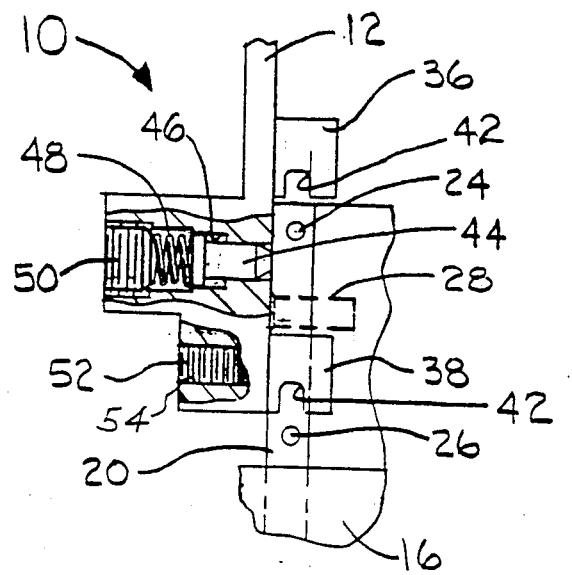
FIGS. 5–7 are enlarged sequential front elevational views of one bracket of the apparatus, which bracket is partially broken away to reveal interior details, and of fragmentary upper portions of one of the tools and the adjacent portion of the tool holder, the views sequentially illustrating the transfer of the tool from the tool holder to the bracket.

In the following description and the accompanying drawings, identical components are designated by the same reference numeral with the addition of a prime designation.

The components shown in FIG. 1 of the drawings generally include a pair of bracket means 10, 10' connected by arms 12, 12' to a moveable robot "hand" 14 forming part of a robotic machine conventionally having driven supporting structure (not shown) by which hand 14 is supported and moved as desired in differing directions. Arms 12, 12' mount brackets 10, 10' for movement in unison with the hand and for movement relative to it in the direction of the double-headed arrows under the impetus of suitable drive means (not shown) associated with the hand and with the upper ends of arms 12, 12'. The FIG. 1 apparatus further includes a tool holder 16 fixedly mounted in any suitable manner upon a base 18 and supporting a pair of tool elements 20, 20' that are connectable at desired times to brackets 10, 10' for use in the performance of a task by the robot of which hand 14 forms a part. Although only a single tool holder is shown, it will be appreciated that any. desired number of them might be mounted upon base 18, at spaced locations along its length, and that the tools supported thereby might be of any desired differing types.

Referring now also to FIGS. 3 and 4 of the drawings, as well as to FIG. 1, the illustrated tools 20, 20' are simple rectangularly-shaped "finger" elements such as might be used to cooperatively grasp or clamp an object (not shown) located therebetween. A bore 22 extends through the upper shank portion of tool 20. Upper and lower pairs of aligned stud elements 24 and 26 project outwardly from opposite sides of the shank portion of tool 20 in vertically spaced parallel relationship to each other. Bore 22 comprises part of engageable and disengageable connecting means by which tool 20 is releasably connected to holder 16. In the illustrated embodiment of the apparatus, the aforesaid connecting means further includes a cylindrical pin element 28 projecting horizontally outwardly from one side of the upper portion of holder 16, and a pair of spring-loaded ball-type detents 30 projecting from one side of a slot 32 extending vertically through the lower portion of holder 16. When tool 20 is mounted upon holder 16, holder pin 28 projects into bore 22 and the outer surfaces of the pin and of tool 20 are substantially coplanar. Tool 20 is received by holder slot 32 and projects vertically beyond it. Detents 30 engage the adjacent side face of tool 20 and bias the opposite side of the tool into engagement with the opposite side of holder slot 32. The outer edge 34 of the aforesaid opposite side of holder slot 32 preferably and illustratively is beveled, as shown in FIG. 3, to facilitate introduction of tool 20 within slot 32. The biasing force of detents 30 is sufficient to prevent inadvertent disengagement of tool 20 from holder 16 by vibration and the like, while allowing positive removal of the tool from the open side of holder slot 32, in a manner subsequently decribed, when desired.

Tool 20' is identical to tool 20, and is mounted in the same manner upon the opposite side of holder 16 by holder components identical to those associated with tool 20.

Bore 22 of tool 20 also comprises part of engageable and disengageable connecting means for releasably connecting the tool at desired times to bracket 10 of robot hand 14. Such connecting means additionally includes upper and lower pairs of aligned arm elements 36 and 38 that project horizontally outwardly from side face 40 of bracket 10 and have undersurface grooves or openings 42 adapted to captively receive stud elements 24, 26 of tool 20. The aforesaid connecting means further includes a pin element 44 slidably mounted within a bore 46 extending horizontally through bracket 10 and opening from face 40 thereof. A spring 48 within bore 46 biases pin 44 to the right, as viewed in FIGS. 1 and 5-7 of the drawings, such that the tapered outer end of the stud normally projects beyond the plane of bracket face 40. The magnitude of the biasing force exerted upon pin 44 by spring 48 may be adjusted by rotation of a set screw 50 disposed within an enlarged diameter, threaded rearward portion of bracket bore 46. For purposes subsequently described, another adjustable set screw 52 (FIG. 5) is provided within a threaded bore 54 also extending through bracket 10 and its face 40 at a location below that of the first mentioned bore 46 and screw 50.

The construction of bracket 10' may be and illustratively is identical to that of bracket 10.

Figure 6:
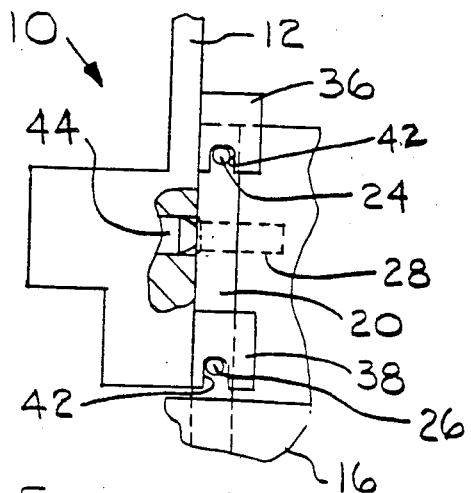
Figure 7:
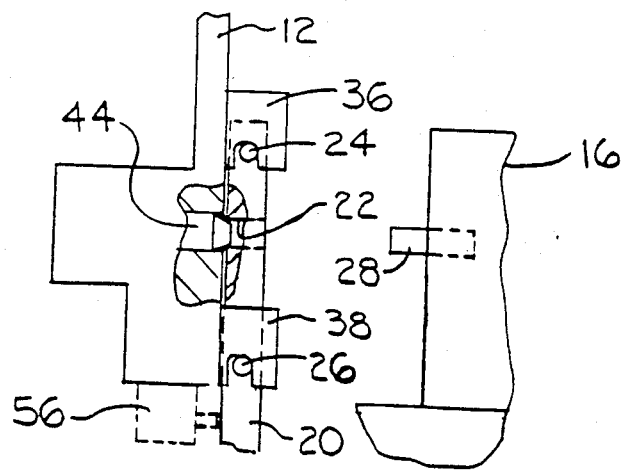

Referring now particularly to FIGS. 5-7, transfer of tool 20 from holder 16 to bracket 10 is initiated by movement of the bracket to a position such as illustrated in FIG. 5 and wherein bracket face 40 is in overlying engagement with the left surface of tool 20, and bracket arms 36, 38 respectively overlie stud elements 24, 26 of tool 20. Movement of bracket 10 to its aforesaid illustrated position may be effected by vertical movement of hand 14 (FIG. 1) and by horizontal movement of the hand and/or of the arm 12 supporting bracket 10 for movement relative to hand 14. In any event, during horizontal movement of bracket 10 to its FIG. 5 position, engagement between pin element 44 and the surface of tool 20 occurs. Continued movement of bracket 10 into engagement with the surface of tool 20 then causes axial movement of the pin element from its FIG. 1 extended position to a retracted position such as shown in FIG. 5 and wherein the tapered outer end of the pin element does not project significantly beyond bracket face 40.

Bracket 10 next is moved vertically downwardly, by vertical movement of robot hand 14 (FIG. 1), to a position such as illustrated in FIG. 6. This causes stud elements 24 and 26 upon tool 20 to be captively received within undersurface openings 40, 42 of bracket arms 36 and 38, respectively. The vertical movement of bracket 10 also axially aligns pin element 44 of bracket 10 and tool bore 22. However, pin 44 is prevented from entering bore 22 by its abutment with the outer end of the holder pin 28 then still with the bore.

As is indicated in FIG. 7, bracket 10 next undergoes outward horizontal movement away from tool holder 16. During the initial part of such movement, tool 20 slides outwardly along holder pin 28 due to the engagement of bracket arms 36, 38 with the tool stud elements 24, 26. This allows the tapered outer end portion of spring-biased bracket pin 44 to pass into the chamferred outer end portion of tool bore 22. The biasing force exerted by spring 48 (FIG. 5) upon pin 44 then causes the latter to maintain engagement between tool studs 24, 26 and bracket arms 36, 38. Tool 20 thus remains connected to bracket 10 following the tool's complete disengagement from pin 28 and detents 30 (FIG. 3) of holder 16.

The slightly undersize/oversize relationship between tool studs 24, 26 and the undersurface openings of bracket arms 36, 38 causes tool 20 to normally be biased by spring 48 (FIG. 5) to a forwardly (rightwardly, as viewed in the drawings) position shown in FIG. 7 and wherein the tool is spaced forwardly from bracket face 40. Tool 20 therefore is capable of limited translatory rearward (leftward) movement relative to bracket 10, and also of limited pivotal movement in a clockwise (as viewed in FIG. 7) direction about the axis of upper tool studs 24. The aforesaid movements of tool 20 are resiliently opposed by the biasing force of spring 48, which force may be varied by rotation of set screw 50 (FIG. 5). The maximum extent of the aforesaid movements of tool 20 may be varied by changing the extent of the projection of set screw 52 (FIGS. 2 and 5) beyond bracket face 40. The tool's capability for restricted rearward movements may if desired be advantageously employed to limit the force initially imposed by the tool on an engaged object (not shown) clamped between tools 20, 20'. In association with a suitable motion sensor, such as the limit switch 56 shown by phantom lines in FIG. 7, the rearward movement of tool 20 may also be utilized to detect the tool's engagement with and/or disengagement from an object.

Upon completion of use of tool 20 by the robot, the tool is returned from bracket 20 to holder 16 by causing the bracket to undergo in reverse sequence the movements described above and illustrated in FIGS. 5-7.

When the apparatus has bilateral symmetry, as shown, it will be noted that tools 20, 20' may be simultaneously transferred between brackets 10, 10' and tool holder 16.

Although a specific embodiment of the invention has been shown and described, this was for purposes of illustration only, and not for purposes of limitation, the scope of the invention being in accordance with the following claims.

We claim:

1. In a robotic tool changing apparatus including a tool holder, a movable robot hand, and a tool adapted to be selectively connected to said tool holder and to said hand, the improvement comprising:
   bracket means connected to said hand for movement therewith;
   engageable and disengageable connecting means upon said bracket means and upon said tool for, when engaged, connecting said tool to said bracket;
   engageable and disengageable connecting means upon said tool holder and upon said tool for, when engaged, connecting said tool to said holder;
   said first mentioned connecting means including a pin element upon said brakcet means, and said second mentioned connecting means including a pin element upon said tool holder, and each said connecting means including a pin receiving opening extending through said tool and having first and second opposite end portions for receiving respective ones of said pin elements.

2. Apparatus as in claim 1, wherein said pin elements have free end portions that abut each other during transfer of said tool between said bracket means and said holder.

3. Apparatus as in claim 2, wherein one of said pin elements is moveable between extended and retracted positions.

4. Aparatus as in claim 3, and further including means carried by said bracket means for basing said one of said pin elements toward an extended position thereof, and means for adjustably varying the biasing force of said biasing means.

5. Apparatus as in claim 4, wherein said first connecting means further includes stud elements upon said tool and stud receiving elements upon said brackets means, said stud elements and said stud receiving elements being resiliently maintained in cooperating relationship with each other by said one of said pin elements and said biasing means of said bracket means.

6. Apparatus as in claim 1, wherein said first mentioned connecting means permits, when engaged, limited movement of said tool relative to said bracket means.

7. Apparatus as in claim 6, and further including adjustable means carried by said bracket means for restricting to an adjustably variable degree the extent of said movement of said tool relative to said bracket means.

8. Apparatus as in claim 6, and further including sensor means for detecting said movement of said tool relative to said bracket means.

9. In a robotic tool changing apparatus including a tool holder, a movable robot hand, and a pair of tools adapted to be selectively transferred between and connected to said tool holder and to said hand, the improvement comprising:

a pair of bracket means connected to said hand for movement therewith and for movement relative to said hand and to each other;

engagable and disengagable connecting means upon said pair of brackets means and upon said tools for, when engaged, connecting said tools to respective ones of said bracket means;

engagable and disengagable connecting means upon said tool holder and upon said tools for, when engaged, connecting said tools to said holde;

said first mentioned connecting means including pin elements disposed upon respective ones of said bracket means and projecting therefrom toward one another, and said second mentioned connecting means including pin elements disposed upon and projecting outwardly from opposite sides of said tool holder;

said tools having pin receiving openings therein forming part of said first mentioned and said second mentioned connecting means and each having first and second opposite end portions, said first end portions of said openings receiving said first mentioned pin elements and said second end portions of said openings simultaneously receiving said second mentioned pin elements during transfer of said tools between said hand said said holder.

10. Apparatus as in claim 9, wherein said pin receiving openings extend completely through said tools.

* * * * *